United States Patent [19]
Bogdan et al.

[11] Patent Number: 5,858,908
[45] Date of Patent: Jan. 12, 1999

[54] SELECTIVE MULTIMETALLIC-MULTIGRADIENT REFORMING CATALYST

[75] Inventors: Paula L. Bogdan; Tamotsu Imai, both of Mount Prospect, Ill.

[73] Assignee: UOP LLC, Des Plaines, Ill.

[21] Appl. No.: 840,562

[22] Filed: Apr. 17, 1997

[51] Int. Cl.[6] .......................... B01J 27/06; B01J 27/135; B01J 27/13; B01J 27/125
[52] U.S. Cl. .................. 502/227; 502/224; 502/230; 502/231; 502/334; 502/339; 502/349; 502/352
[58] Field of Search ...................... 502/224, 230, 502/231, 332, 334, 339, 349, 352, 355, 227

[56] References Cited

U.S. PATENT DOCUMENTS

3,951,868  4/1976  Wilhelm ..................... 252/466 PT
4,522,935  6/1985  Robinson et al. ................ 502/223
4,786,625  11/1988  Imai et al. ..................... 502/326

*Primary Examiner*—Michael L. Lewis
*Assistant Examiner*—Alexander G. Ghyka
*Attorney, Agent, or Firm*—Thomas K. McBride; John F. Spears, Jr.; Richard E. Conser

[57] ABSTRACT

A novel catalyst and the use thereof in a reforming process is disclosed. The dual-function catalyst comprises a refractory inorganic oxide, indium, Group IVA(IUPAC 14) metal, and a platinum-group metal concentrated in the surface layer of each catalyst particle. Utilization of this catalyst in the conversion of hydrocarbons, especially in reforming, results in significantly improved selectivity to the desired gasoline or aromatics product.

9 Claims, 9 Drawing Sheets

SELECTIVE MULTIMETALLIC-MULTIGRADIENT REFORMING CATALYST

FIELD OF THE INVENTION

This invention relates to an improved catalyst for the conversion of hydrocarbons, and more specifically for the catalytic reforming of gasoline-range hydrocarbons.

BACKGROUND OF THE INVENTION

The subject of the present invention is a novel dual-function catalytic composite, characterized by a combination of three or more metals with specified gradients on the finished catalyst particle, and its use in hydrocarbon conversion. Catalysts having both a hydrogenation-dehydrogenation function and an isomerization/cracking function ("dual-function" catalysts) are used widely in many applications, particularly in the petroleum and petrochemical industry, to accelerate a wide spectrum of hydrocarbon-conversion reactions. The isomerization/cracking function generally relates to an acid-action material of the porous, adsorptive, refractory-oxide type which is typically utilized as the support or carrier for a heavy-metal component, such as the Group VIII(IUPAC 8–10) metals, which primarily contribute the hydrogenation-dehydrogenation function. Other metals in combined or elemental form can influence one or both of the isomerization/cracking and hydrogenation-dehydrogenation functions.

In another aspect, the present invention comprehends improved processes that emanate from the use of the novel catalyst. These dual-function catalysts are used to accelerate a wide variety of hydrocarbon-conversion reactions such as dehydrogenation, hydrogenation, hydrocracking, hydrogenolysis, desulfurization, cyclization, catalytic cracking, alkylation, polymerization, and isomerization. In a specific aspect, an improved reforming process utilizes the subject catalyst to increase selectivity to gasoline and aromatics products.

Catalytic reforming comprises a variety of reaction sequences, including dehydrogenation of cyclohexanes to aromatics, dehydroisomerization of alkylcyclopentanes to aromatics, dehydrocyclization of an acyclic hydrocarbon to aromatics, hydrocracking of paraffins to light products boiling outside the gasoline range, dealkylation of alkylbenzenes and isomerization of paraffins. Some of the reactions occurring during reforming, such as hydrocracking which produces light paraffin gases, have a deleterious effect on the yield of products boiling in the gasoline range. Improvements in catalytic reforming technology thus are targeted toward enhancing those reactions effecting a higher yield of the gasoline fraction at a given octane number.

It is of critical importance that a dual-function catalyst exhibit the capability both to initially perform its specified functions efficiently and to perform them satisfactorily for prolonged periods of time. The parameters used in the art to measure how well a particular catalyst performs its intended functions in a particular hydrocarbon reaction environment are activity, selectivity and stability. In a reforming environment, these parameters are defined as follows:

Activity is a measure of the ability of the catalyst to convert hydrocarbon reactants to products at a designated severity level representing a combination of reaction conditions: temperature, pressure, contact time, and hydrogen partial pressure. Activity typically is designated as the octane number of the pentanes and heavier ("$C_5+$") product stream from a given feedstock at a given severity level, or conversely as the temperature required to achieve a given octane number.

Selectivity refers to the percentage yield of petrochemical aromatics or $C_5+$ gasoline product from a given feedstock at a particular activity level.

Stability refers to the rate of change of activity or selectivity per unit of time or of feedstock processed. Activity stability generally is measured as the rate of change of operating temperature per unit of time/feedstock to achieve a given $C_5+$ product octane, with a lower rate of change corresponding to better activity stability. Selectivity stability is measured as the rate of decrease of $C_5+$ product or aromatics yield per unit of time or of feedstock.

Research and development to improve performance of reforming catalysts is being stimulated by the reformulation of gasoline, following upon widespread removal of lead antiknock additive, in order to reduce harmful vehicle emissions. Gasoline-upgrading processes such as catalytic reforming must operate at higher efficiency with greater flexibility in order to meet these changing requirements. Catalyst selectivity is becoming ever more important to tailor gasoline components to these needs while avoiding losses to lower-value products. The major problem facing workers in this area of the art, therefore, is to develop more selective catalysts while maintaining effective catalyst activity and stability.

The art teaches the use of indium in multimetallic catalysts for the catalytic reforming of naphtha feedstocks. U.S. Pat. No. 3,951,868 (Wilhelm) teaches a catalyst comprising platinum, halogen, germanium or tin, and indium wherein the ratio of indium to platinum-group metal is about 0.1:1–1:1. U.S. Pat. No. 4,522,935 (Robinson et al.) discloses a catalyst comprising a platinum-group metal, tin, indium, a halogen, and a porous support which may comprise alumina. The feature of the catalyst is an atomic ratio of indium to platinum-group metal of more than 1.35, and preferably about 2.55. Neither of these references suggest a multigradient catalyst in which the platinum-group metal is concentrated in the surface layer.

U.S. Pat. No. 4,786,625 (Imai et al.) teaches a dehydrogenation catalyst comprising a surface-impregnated platinum-group metal and a modifier selected from tin, germanium and rhenium on a refractory support having a nominal diameter of at least 850 microns. The catalyst preferably is nonacidic to minimize isomerization activity through incorporation of an alkali or alkaline earth metal.

SUMMARY OF THE INVENTION

It is an object of the invention to provide a novel catalyst for improved selectivity in hydrocarbon conversion. A corollary object of the invention is to provide a reforming process having improved selectivity with respect to gasoline or aromatics yields.

The invention originates from the discovery that a dual-function catalyst containing surface-layer platinum and uniformly dispersed tin and indium on chlorided alumina shows improved yields of $C_5+$ product in a reforming reaction.

A broad embodiment of the present invention is a dual-function catalyst comprising a refractory inorganic oxide and a multigradient metal component comprising indium, a Group IVA(IUPAC 14) metal, and a platinum-group metal which is present in a catalyst particle as a surface-layer component. The Group IVA metal and indium preferably are uniformly dispersed in the catalyst particle. The catalyst optimally also comprises a halogen component, especially chlorine. In preferred embodiments the refractory inorganic oxide is alumina, the platinum-group metal is platinum, and the Group IVA metal is tin. A highly preferred catalyst comprises uniformly dispersed tin and indium and surface-layer platinum.

In another aspect, the invention is a process for the conversion of a hydrocarbon feedstock utilizing the present catalyst. Preferably the hydrocarbon conversion is catalytic reforming of a naphtha feedstock, utilizing the catalyst of the invention to increase the yield of gasoline and/or aromatics. The conversion more preferably comprises dehydrocyclization to increase aromatics yields.

These as well as other objects and embodiments will become evident from the following detailed description of the present invention.

DESCRIPTION OF THE PREFERRED EMBODIMENTS

A broad embodiment of the present invention, therefore, is a dual-function catalyst comprising a refractory inorganic-oxide support and a multigradient metal component comprising indium, at least one metal of Group IVA(IUPAC 14) of the Periodic Table [See Cotton and Wilkinson, *Advanced Inorganic Chemistry,* John Wiley & Sons (Fifth Edition, 1988)] and a surface-layer platinum-group metal. In another aspect, the invention embraces the use of the present catalyst in hydrocarbon conversion and especially in a reforming process.

The refractory support utilized in the present invention usually is a porous, adsorptive, high-surface area support having a surface area of about 25 to about 500 $m^2/g$. The porous carrier material should also be uniform in composition and relatively refractory to the conditions utilized in the hydrocarbon conversion process. By the terms "uniform in composition" it is meant that the support be unlayered, has no concentration gradients of the species inherent to its composition, and is completely homogeneous in composition. Thus, if the support is a mixture of two or more refractory materials, the relative amounts of these materials will be constant and uniform throughout the entire support. It is intended to include within the scope of the present invention carrier materials which have traditionally been utilized in dual-function hydrocarbon conversion catalysts such as:

(1) refractory inorganic oxides such as alumina, magnesia, titania, zirconia, chromia, zinc oxide, thoria, boria, silica-alumina, silica-magnesia, chromia-alumina, alumina-boria, silica-zirconia, etc.;

(2) ceramics, porcelain, bauxite;

(3) silica or silica gel, silicon carbide, clays and silicates which are synthetically prepared or naturally occurring, which may or may not be acid treated, for example attapulgus clay, diatomaceous earth, fuller's earth, kaolin, or kieselguhr;

(4) crystalline zeolitic aluminosilicates, such as X-zeolite, Y-zeolite, mordenite, β-zeolite, Ω-zeolite or L-zeolite, either in the hydrogen form or most preferably in nonacidic form with one or more alkali metals occupying the cationic exchangeable sites;

(5) non-zeolitic molecular sieves, such as aluminophosphates or silico-alumino-phosphates; and (6) combinations of one or more materials from one or more of these groups.

Preferably the refractory support comprises one or more inorganic oxides, with the preferred refractory inorganic oxide for use in the present invention being alumina. Suitable alumina materials are the crystalline aluminas known as the gamma-, eta-, and theta-alumina, with gamma- or eta-alumina giving best results. The preferred refractory inorganic oxide has an apparent bulk density of about 0.3 to about 1.0 g/cc and surface-area characteristics such that the average pore diameter is about 20 to 300 angstroms, the pore volume is about 0.1 to about 1 cc/g, and the surface area is about 100 to about 500 $m^2/g$. Optimally the refractory inorganic oxide comprise substantially pure Ziegler alumina as described hereinbelow having an apparent bulk density of about 0.6 to about 1 g/cc, a pore volume of 0.3 to 0.8 cc/g) and surface area of about 150 to 280 $m^2/g$ (preferably 185 to 235 $m^2/g$).

Considering that alumina is the preferred refractory inorganic oxide, a particularly preferred alumina is that which has been characterized in U.S. Pat. Nos. 3,852,190 and 4,012,313 as a by-product from a Ziegler higher alcohol synthesis reaction as described in Ziegler's U.S. Pat. No. 2,892,858, hereinafter referred to as a "Ziegler alumina". Ziegler alumina is presently available from the Vista Chemical Company under the trademark "Catapal" or from Condea Chemie GmbH under the trademark "Pural," and will be available from ALCOA under the trademark "HiQ-20." This high-purity pseudoboehmite, after calcination at a high temperature, has been shown to yield a gamma-alumina of extremely high purity.

The alumina powder can be formed into any desired shape or type of carrier material known to those skilled in the art such as spheres, rods, pills, pellets, tablets, granules, extrudates, and like forms by methods well known to the practitioners of the catalyst material forming art.

The preferred form of the present catalyst support is a sphere, with a preferred diameter of between about 0.7 mm and 3.5 mm. Alumina spheres may be continuously manufactured by the well known oil-drop method which comprises: forming an alumina hydrosol by any of the techniques taught in the art and preferably by reacting aluminum metal with hydrochloric acid; combining the resulting hydrosol with a suitable gelling agent; and dropping the resultant mixture into an oil bath maintained at elevated temperatures. The droplets of the mixture remain in the oil bath until they set and form hydrogel spheres. The spheres are then continuously withdrawn from the oil bath and typically subjected to specific aging and drying treatments in oil and an ammoniacal solution to further improve their physical characteristics. The resulting aged and gelled particles are then washed and dried at a relatively low temperature of about 150° to about 205° C. and subjected to a calcination procedure at a temperature of about 450° to about 700° C. for a period of about 1 to about 20 hours. This treatment effects conversion of the alumina hydrogel to the corresponding crystalline gamma-alumina. U.S. Pat. No. 2,620,314 provides additional details and is incorporated herein by reference thereto.

An alternative form of carrier material is a cylindrical extrudate, preferably prepared by mixing the alumina powder with water and suitable peptizing agents such as HCl until an extrudable dough is formed. The amount of water added to form the dough is typically sufficient to give a loss on ignition (LOI) at 500° C. of about 45 to 65 mass-%, with a value of 55 mass-% being preferred. The acid addition rate is generally sufficient to provide 2 to 7 mass-% of the volatile-free alumina powder used in the mix, with a value of 3 to 4 mass-% being preferred. The resulting dough is extruded through a suitably sized die to form extrudate particles. These particles are then dried at a temperature of about 260° to about 427° C. for a period of about 0.1 to 5 hours to form the extrudate particles. The preferred diameter of cylindrical extrudate particles is between about 0.7 and 3.5 mm, with a length-to-diameter ratio of between about 1:1 and 5:1.

An essential component of the present catalyst is a multigradient metal component comprising indium, a Group IVA (IUPAC 14) metal, and a platinum-group metal. "Multigradient" designates the differing distribution of two or more metals in particles of the catalyst, particularly the concentration of metal as measured between the external surface and the central core of such particles. Preferably the indium and Group IVA metal are uniformly distributed throughout the catalyst particle, although it is within the scope of the invention that these two metal components have differing distributions. The platinum-group metal is present in the catalyst particles as a "surface-layer" component. A metal "component" refers to the metal as a complex combination with the carrier or other catalyst components, in combined form and/or in the elemental state.

Indium is an essential component of the multi-gradient metal component of the present catalyst. The indium may be present in the catalytic composite in any catalytically available form such as the elemental metal, a compound such as the oxide, hydroxide, halide, oxyhalide, aluminate, or in chemical combination with one or more of the other ingredients of the catalyst. Although not intended to so restrict the present invention, it is believed that best results are obtained when the indium is present in the composite in a form wherein substantially all of the indium moiety is in an oxidation state above that of the elemental metal such as in the form of the oxide, oxyhalide or halide or in a mixture thereof and the subsequently described oxidation and reduction steps that are preferably used in the preparation of the instant catalytic composite are specifically designed to achieve this end.

Indium can be present in the catalyst in any amount which is catalytically effective, with good results obtained with about 0.1 to about 5 mass-% indium on an elemental basis in the catalyst. Best results are ordinarily achieved with about 0.2 to about 2 mass-% indium, calculated on an elemental basis. The preferred atomic ratio of indium to platinum group metal for this catalyst is at least about 2:1, preferably about 1.5:1 or greater, and especially from about 3:1 or more.

An indium component is incorporated in the catalytic composite in any suitable manner known to the art, such as by coprecipitation, cogelation or coextrusion with the porous carrier material, ion exchange with the gelled carrier material, or impregnation of the porous carrier material either after, before, or during the period when it is dried and calcined. It is intended to include within the scope of the present invention all conventional methods for incorporating and simultaneously distributing a metallic component in a catalytic composite in a desired manner, as the particular method of incorporation used is not deemed to be an essential feature of the present invention. Preferably the method used results in a relatively uniform dispersion of the indium moiety in the carrier material.

One suitable method of incorporating indium into the catalytic composite involves cogelling or coprecipitating the indium component in the form of the corresponding hydrous oxide or oxyhalide during the preparation of the preferred carrier material, alumina. This method typically involves the addition of a suitable sol-soluble or sol-dispersible indium compound such as the indium trichloride, indium oxide, and the like to the alumina hydrosol and then combining the indium-containing hydrosol with a suitable gelling agent and dropping the resulting mixture into an oil bath, etc., as explained in detail hereinbefore. Alternatively, the indium compound can be added to the gelling agent. After drying and calcining the resulting gelled carrier material in air, an intimate combination of alumina and indium oxide and/or oxychloride is obtained.

Another effective method of incorporating the indium into the catalytic composite involves utilization of a soluble, decomposable compound of indium in solution to impregnate the porous carrier material. In general, the solvent used in this impregnation step is selected on the basis of the capability to dissolve the desired indium compound and to hold it in solution until it is evenly distributed throughout the carrier material without adversely affecting the carrier material or the other ingredients of the catalyst. Suitable solvents comprise alcohols, ethers, acids, and the like, with an aqueous, acidic solution being preferred. Thus, the indium component may be added to the carrier material by commingling the carrier with an aqueous acidic solution of suitable indium salt, complex, or compound such as a nitrate, chloride, fluoride, organic alkyl, hydroxide, oxide, and the like compounds. Suitable acids for use in the impregnation solution are: inorganic acids such as hydrochloric acid, nitric acid, and the like, and strongly acidic organic acids such as oxalic acid, malonic acid, citric acid, and the like. The indium component can be impregnated into the carrier either prior to, simultaneously with, or after the platinum-group metal component.

A Group IVA(IUPAC 14) metal component is an essential ingredient of the catalyst of the present invention. Of the Group IVA metals, germanium and tin are preferred and tin is especially preferred. This component may be present as an elemental metal, as a chemical compound such as the oxide, sulfide, halide, oxychloride, etc., or as a physical or chemical combination with the porous carrier material and/or other components of the catalytic composite. Preferably, a substantial portion of the Group IVA metal exists in the finished catalyst in an oxidation state above that of the elemental metal. The Group IVA metal component optimally is utilized in an amount sufficient to result in a final catalytic composite containing about 0.01 to about 5 mass % metal, calculated on an elemental basis, with best results obtained at a level of about 0.1 to about 2 mass-% metal.

The Group IVA(IUPAC 14) metal component may be incorporated in the catalyst in any suitable manner to achieve a homogeneous dispersion, such as by coprecipitation with the porous carrier material, ion-exchange with the carrier material or impregnation of the carrier material at any stage in the preparation. One method of incorporating the Group IVA metal component into the catalyst composite involves the utilization of a soluble, decomposable compound of a Group IVA metal to impregnate and disperse the metal throughout the porous carrier material. The Group IVA metal component can be impregnated either prior to, simultaneously with, or after the other components are added to the carrier material. Thus, the Group IVA metal component may be added to the carrier material by commingling the latter with an aqueous solution of a suitable metal salt or soluble compound such as stannous bromide, stannous chloride, stannic chloride, stannic chloride pentahydrate; or germanium oxide, germanium tetraethoxide, germanium tetrachloride; or lead nitrate, lead acetate, lead chlorate and the like compounds. The utilization of Group IVA metal chloride compounds, such as stannic chloride, germanium tetrachloride or lead chlorate is particularly preferred since it facilitates the incorporation of both the metal component and at least a minor amount of the preferred halogen component in a single step. When combined with hydrogen chloride during the especially preferred alumina peptization step described hereinabove, a homogeneous dispersion of the Group IVA metal component is obtained in accordance with the present invention. In an alternative embodiment, organic metal compounds such as trimethyltin chloride and dimethyltin dichloride are incorporated into the catalyst during the peptization of the inorganic oxide binder, and most preferably during peptization of alumina with hydrogen chloride or nitric acid.

A surface-layer platinum-group metal component is an essential component of the present catalyst. Of the platinum-group metals, i.e., platinum, palladium, rhodium, ruthenium, osmium and iridium, palladium is a preferred component and platinum is especially preferred. Mixtures of platinum-group metals also are within the scope of this invention. This component may exist within the final catalytic composite as a compound such as an oxide, sulfide, halide, or oxyhalide, in chemical combination with one or more of the other ingredients of the composite, or as an elemental metal. Best results are obtained when substantially all of this component is present in the elemental state. This component may be present in the final catalyst composite in any amount which is catalytically effective, but relatively small amounts are preferred. In fact, the surface-layer platinum-group metal component generally will comprise about 0.01 to 2 mass-% of the final catalyst, calculated on an elemental basis. Excellent results are obtained when the catalyst contains about 0.05 to 1 mass-% of platinum.

An essential feature of the catalyst of the present invention, therefore, is that the platinum-group metal component is concentrated in the surface layer of each catalyst particle. "Layer" is a stratum of the catalyst particle of substantially uniform thickness. The "surface layer" is the layer of the catalyst particle adjacent to the external surface of the particle. "Diameter" is defined as the minimum regular dimension through the center of the catalyst particle; for example, this dimension would be the diameter of the cylinder of an extrudate. "Radius" is defined as the distance from the surface to the center of the catalyst particle, being half of the diameter of the particle. As exemplified hereinbelow, the surface layer comprises a layer extending 50 to 100 microns into the catalyst particle from the external surface of the particle; within the preferred range of particle sizes, the surface layer is usefully measured at a depth of 100 microns for a catalyst particle having a diameter of from about 1.2 to 3.5 mm, and at a depth of 50 microns for particles in the 0.7 to 2 mm range. A central core is measured as a portion surrounding the center of the particle and corresponding 50% of the diameter of the particle. "Central core" is defined in the present invention as a concentric cylindrical or spherical portion of a cylindrical or spherical catalyst particle, respectively, having a diameter that is 50% of the diameter of the catalyst particle. For the alternative extrudate particles, the central core is a concentric cylindrical portion excluding the surface layer at the ends of the extrudate particles. Other quantitative criteria relating to the definition of a surface layer and central core are not excluded by these specific definitions.

The characterization of the platinum-group metal component as a "surface-layer" component is intended to encompass a platinum-group metal component gradient upon and within the catalyst support. The concentration of platinum-group metal component tapers off, generally very sharply, in progressing from the surface to the center of the catalyst particle. The actual gradient of the platinum-group metal component within the catalyst particle varies depending upon the manufacturing method used to fabricate the catalyst. Optimally about 50% or more of the surface-layer platinum-group metal is contained in the 100-micron surface layer of the catalyst. Alternatively, the definition may be stated as 40% or more of the surface-layer metal being contained in the 50-micron surface layer of the catalyst. Preferably the concentration of the platinum-group metal component in the surface layer of the catalyst is at least twice, more preferably at least five times, and most preferably at least ten times, the concentration in the central core of the catalyst particle.

The gradient of the Group VIII noble metals preferably is determined by Scanning Electron Microscopy ("SEM"). SEM determinations of local metal concentrations are effected on at least three sample particles from a bed of catalyst particles. Particle samples are selected from the bed by techniques known to those of ordinary skill in the art. The SEM data show the approximate metals content of any one point within the catalyst pill, based on the metals distribution profile in relation to the alumina level. The result of each analysis may not be based upon a zero point. The entire curve could be shifted either up or down, and the value of the integrated distribution curve therefore does not relate directly to the measured average concentration. The data thus are useful for evaluating and comparing the distribution of metals but not in determining overall metal contents.

A metal, such as the indium or Group IVA(IUPAC 14) components described hereinbefore, is considered uniformly dispersed if no clear pattern of metal distribution is apparent between the external surface and the center of catalyst particles. More specifically, uniform dispersion may be defined by the standard deviation of metal concentrations at five or more strata derived from determinations on three or more particles being less than about 25% of the average SEM-determined concentration on the particles. Preferably, the standard deviation of the uniformly dispersed metal concentration is less than about 15% of the average SEM-determined concentration on the particles.

Typical but non-limiting platinum-group metal compounds which may be employed in preparing the surface-layer platinum component of the catalyst of the invention include chloroplatinic acid, ammonium chloroplatinate, bromoplatinic acid, platinum dichloride, platinum tetrachloride hydrate, platinum dichlorocarbonyl dichloride, dinitrodiaminoplatinum, palladium chloride, palladium chloride dihydrate, palladium nitrate, etc., and analogous compounds of the other platinum-group metals. Chloroplatinic acid or tetraamine platinum chloride are preferred compounds of the preferred platinum component.

The platinum-group metal component may be incorporated into the catalyst of the present invention by any means suitable to result in a surface-layer component, and the methods described hereinafter are not intended to limit the scope of the invention. One suitable method involves surface-impregnating the platinum-group component by means of a low-acid impregnation utilizing a solution of a soluble, decomposable complex compound of the platinum group component. In general the solvent used in this impregnation step is selected on the basis of its capability to dissolve the desired decomposable complex compound and is a low-acid, preferably aqueous solution. By low-acid it is meant that the impregnation solution generally has a normality of 2 or less. A surface-layer platinum-group metal component may be impregnated onto the catalyst from a solution of chloroplatinic acid in the absence of strong mineral acids such as hydrochloric and nitric acid.

The surface-layer platinum-group metal component alternatively may be incorporated into the catalyst by spray impregnation. For example, a catalytic support as described hereinbefore is placed into a rotating drum which contains a spray nozzle. A solution of the salt of the surface-layer metal is ejected from the nozzle using air to form fine droplets of spray, which contact the support in the rotating drum for effective mixing. The volume ratio of solution to support is sufficient to effect the desired concentration of surface-layer metal in the catalyst, but generally less than the catalyst pore volume and preferably amounts to about 5 to about 50% of the pore volume. The catalyst composite in the drum is rolled for a period of from about 0.1 to 12 hours, preferably from about 0.1 to 1 hour, and dried for about 0.2 to 12 hours at a temperature of between about 150° and 250° C.

Alternatively, the platinum-group metal component may be surface impregnated via the formulation of a chemical complex of the platinum-group metal component which is strongly attracted to the refractory oxide support, resulting in the platinum group metal being retained primarily upon the outer surface of the catalyst. Any compound that is known to complex with the desired platinum-group component and with the metal component of the refractory inorganic-oxide support may be used in the preparation of the catalyst of the present invention. It has been found that a multi-dentated ligand is very useful in complexing with a platinum group metal and the refractory inorganic oxide support, resulting in surface-impregnation of the platinum-group metal component. Multi-dentated ligands are compounds that contain more than one appendage that can bond strongly to the oxide support. For example, the multi-dentated ligand may contain a functional group such as —SH or $PR_2$ (where R is hydrocarbon) that has a high affinity towards the platinum group metal component and a second functional group comprising a component that can be strongly adsorbed onto the metal oxide support. Such appendages would typically comprise carboxylic acids, amino groups, thiol groups, phosphorus groups, or other strongly polar groups of chemical components. This property of the multi-dentated ligand effectively ensures that the platinum group metal component does not penetrate the catalyst particle, by binding strongly with the platinum group metal while also binding to the support quickly and strongly. Examples of some useful multi-dentated ligands include thiomalic acid (TMA), thiolactic acid, mercaptopropionic acid, thiodiacetic acid, thioglycolic acid, and thiopropionic acid among others.

Other non-limiting methods include the use of materials which physically prevent the penetration of the platinum-group metal component into the interior of the catalyst particle, such as the nonionic surface-active agent of the poly(oxyethylene) type of U.S. Pat. No. 3,897,368.

Optionally the catalyst may also contain other components or mixtures thereof which act alone or in concert as catalyst modifiers to improve activity, selectivity or stability. Some known catalyst modifiers include rhenium, cobalt, nickel, iron, tungsten, molybdenum, chromium, bismuth, antimony, zinc, cadmium, copper and one or more of the lanthanides. Catalytically effective amounts of these components may be added in any suitable manner to the carrier material during or after its preparation or to the catalytic composite before, while or after other components are being incorporated.

An optional component of the catalyst, particularly useful in hydrocarbon conversion embodiments of the present invention comprising dehydrogenation, dehydrocyclization, or hydrogenation reactions, is an alkali or alkaline-earth metal component. More precisely, this optional ingredient is selected from the group consisting of the compounds of the alkali metals - - - cesium, rubidium, potassium, sodium, and lithium - - - and the compounds of the alkaline earth metals - - - calcium, strontium, barium, and magnesium. Good results are obtained in these embodiments when this component, if present, constitutes about 0.01 to about 5 mass-% of the composite, calculated on an elemental basis. This optional alkali or alkaline earth metal component can be incorporated into the composite in any of the known ways with impregnation with an aqueous solution of a suitable water-soluble, decomposable compound being preferred.

It is necessary to employ at least one oxidation step in the preparation of the catalyst. The conditions employed to effect the oxidation step are selected to convert substantially all of the metallic components within the catalytic composite to their corresponding oxide form. The oxidation step typically takes place at oxidation conditions comprising a temperature of from about 370° to about 600° C. An oxygen atmosphere is employed which typically comprises air. Generally, the oxidation step will be carried out for a period of from about 0.5 to about 10 hours or more, the exact period of time being that required to convert substantially all of the metallic components to their corresponding oxide form. This time will, of course, vary with the oxidation temperature employed and the oxygen content of the atmosphere employed.

The catalyst usually comprises a halogen component, with chlorine being the preferred halogen. The halogen may be introduced in the preparation of the support and/or the incorporation of metal components into the catalyst, or added as an acid such as HCl or HF or a salt. A halogen-adjustment step may also be employed in preparing the catalyst which may serve the dual function of aiding in homogeneous dispersion of a metal component as well as a means of incorporating the desired level of halogen into the final catalytic composite. In the preferred chlorine embodiment, the preferred halogen or halogen-containing compound utilized during the halogen adjustment step is chlorine, HCl or precursor of these compounds. In carrying out the halogen-adjustment step, the catalytic composite is contacted with the halogen or halogen-containing compound in air or an oxygen atmosphere at an elevated temperature of from about 370° to about 600° C. for a period of about 0.5 to 5 hours or more. Water preferably is present in a mole ratio of water to HCl of about 5:1 to about 100:1. Irrespective of the details of the halogen-adjustment step employed, the halogen content of the final catalyst should comprise, on an elemental basis, from about 0.1 to about 10 mass-% of the finished composite.

In preparing the catalyst, it generally is also necessary to employ a reduction step. The reduction step is designed to reduce substantially all of the platinum-group metal component to the corresponding elemental metallic state and to ensure a relatively uniform and finely divided dispersion of this component within the surface layer of the catalytic composite. It is preferred that the reduction step take place in a substantially water-free environment. Preferably, the reducing gas is substantially pure, dry hydrogen (i.e., less than 20 volume ppm water). However, other reducing gases may be employed such as CO, nitrogen, etc. Typically, the reducing gas is contacted with the oxidized catalytic composite at reduction conditions including a reduction temperature of from about 315° to about 650° C. for a period of time of from about 0.5 to 10 or more hours effective to reduce substantially all of the platinum-group metal component to the elemental metallic state. The reduction step may be performed prior to loading the catalytic composite into the hydrocarbon conversion zone or it may be performed in situ as part of a hydrocarbon conversion process start-up procedure. However, if this latter technique is employed, proper precautions must be taken to predry the hydrocarbon conversion plant to a substantially water-free state and a substantially water-free hydrogen-containing reduction gas should be employed.

Optionally, the catalytic composite may be subjected to a presulfiding step. The optional sulfur component may be incorporated into the catalyst by any suitable technique known in the art.

The catalyst of the present invention has particular utility as a hydrocarbon conversion catalyst. The hydrocarbon which is to be converted is contacted with the catalyst at hydrocarbon-conversion conditions, which include a temperature of from 40° to 300° C., a pressure of from atmospheric to 200 atmospheres absolute and liquid hourly space velocities from about 0.1 to 100 $hr^{-1}$. The catalyst is particularly suitable for catalytic reforming of gasoline-range feedstocks, and also may be used for dehydrocyclization, isomerization of aliphatics and aromatics, dehydrogenation, hydrocracking, disproportionation, dealkylation, alkylation, transalkylation, oligomerization, and other hydrocarbon conversions.

In the preferred catalytic reforming embodiment, hydrocarbon feedstock and a hydrogen-rich gas are preheated and charged to a reforming zone containing typically two to five reactors in series. Suitable heating means are provided between reactors to compensate for the net endothermic heat of reaction in each of the reactors. The reactants may contact the catalyst in individual reactors in either upflow, downflow, or radial flow fashion, with the radial flow mode being preferred. The catalyst is contained in a fixed-bed system or, preferably, in a moving-bed system with associated continuous catalyst regeneration. Alternative approaches to reactivation of deactivated catalyst are well known to those skilled in the art, and include semiregenerative operation in which the entire unit is shut down for catalyst regeneration and reactivation or swing-reactor operation in which an individual reactor is isolated from the system, regenerated and reactivated while the other reactors remain on-stream. The preferred continuous catalyst regeneration in conjunction with a moving-bed system is disclosed, inter alia, in U.S. Pat. Nos. 3,647,680; 3,652,231; 3,692,496; and 4,832,291, all of which are incorporated herein by reference.

Effluent from the reforming zone is passed through a cooling means to a separation zone, typically maintained at about 0° to 65° C., wherein a hydrogen-rich gas is separated from a liquid stream commonly called "unstabilized reformate". The resultant hydrogen stream can then be recycled through suitable compressing means back to the reforming zone. The liquid phase from the separation zone is typically withdrawn and processed in a fractionating system in order to adjust the butane concentration, thereby controlling front-end volatility of the resulting reformate.

Operating conditions applied in the reforming process of the present invention include a pressure selected within the range of about 100 kPa to 7 MPa (abs). Particularly good results are obtained at low pressure, namely a pressure of about 350 to 2500 kPa (abs). Reforming temperature is in the range from about 315° to 600° C., and preferably from about 425° to 565° C. As is well known to those skilled in the reforming art, the initial selection of the temperature within this broad range is made primarily as a function of the desired octane of the product reformate considering the characteristics of the charge stock and of the catalyst. Ordinarily, the temperature then is thereafter slowly increased during the run to compensate for the inevitable deactivation that occurs to provide a constant octane product. Sufficient hydrogen is supplied to provide an amount of about I to about 20 moles of hydrogen per mole of hydrocarbon feed entering the reforming zone, with excellent results being obtained when about 2 to about 10 moles of hydrogen are used per mole of hydrocarbon feed. Likewise, the liquid hourly space velocity (LHSV) used in reforming is selected from the range of about 0.1 to about 10 $hr^{-1}$, with a value in the range of about 1 to about 5 $hr^{-1}$ being preferred.

The hydrocarbon feedstock that is charged to this reforming system preferably is a naphtha feedstock comprising naphthenes and paraffins that boil within the gasoline range. The preferred feedstocks are naphthas consisting principally of naphthenes and paraffins, although, in many cases, aromatics also will be present. This preferred class includes straight-run gasolines, natural gasolines, synthetic gasolines, and the like. As an alternative embodiment, it is frequently advantageous to charge thermally or catalytically cracked gasolines, partially reformed naphthas, or dehydrogenated naphthas. Mixtures of straight-run and cracked gasoline-range naphthas can also be used to advantage. The gasoline-range naphtha charge stock may be a full-boiling gasoline having an initial ASTM D-86 boiling point of from about 40°–80° C. and an end boiling point within the range of from about 160°–220° C., or may be a selected fraction thereof which generally will be a higher-boiling fraction commonly referred to as a heavy naphtha - - - for example, a naphtha boiling in the range of 100°–200° C. If the reforming is directed to production of one or more of benzene, toluene and xylenes, the boiling range may be principally or substantially within the range of 60°–150° C. In some cases, it is also advantageous to charge to the process pure hydrocarbons or mixtures of hydrocarbons that have been recovered from extraction units - - - for example, raffinates from aromatics extraction or straight-chain paraffins derived from adsorption processes - - - of which a substantial portion are converted to aromatics according to the present process.

It is generally preferred to utilize the present invention in a substantially water-free environment. Essential to the achievement of this condition in the reforming zone is the control of the water level present in the feedstock and the hydrogen stream which is being charged to the zone. Best results are ordinarily obtained when the total amount of water entering the conversion zone from any source is held to a level less than 50 ppm and preferably less than 20 ppm, expressed as weight of equivalent water in the feedstock. In general, this can be accomplished by careful control of the water present in the feedstock and in the hydrogen stream.

The feedstock can be dried by using any suitable drying means known to the art such as a conventional solid adsorbent having a high selectivity for water; for instance, sodium or calcium crystalline aluminosilicates, silica gel, activated alumina, molecular sieves, anhydrous calcium sulfate, high surface area sodium, and the like adsorbents. Similarly, the water content of the feedstock may be adjusted by suitable stripping operations in a fractionation column or like device. In some cases, a combination of adsorbent drying and distillation drying may be used advantageously to effect almost complete removal of water from the feedstock. Preferably, the feedstock is dried to a level corresponding to less than 20 ppm of $H_2O$ equivalent.

It is preferred concomitantly to maintain the water content of the hydrogen stream entering the hydrocarbon conversion zone at a level of about 10 to about 20 volume ppm or less. In the cases where the water content of the hydrogen stream is above this range, this can be conveniently accomplished by contacting the hydrogen stream with a suitable desiccant such as those mentioned above at conventional drying conditions.

It is a preferred practice to use the present invention in a substantially sulfur-free environment. Any control means known in the art may be used to treat the naphtha feedstock which is to be charged to the reforming reaction zone. For example, the feedstock may be subjected to adsorption processes, catalytic processes, or combinations thereof. Adsorption processes may employ molecular sieves, high surface area silica-aluminas, carbon molecular sieves, crystalline aluminosilicates, activated carbons, high surface area metal-containing compositions, such as Ni or Cu and the like. Feedstocks preferably are treated by conventional catalytic pretreatment methods such as hydrorefining, hydrotreating, hydrodesulfurization, etc., to remove substantially all sulfurous, nitrogenous and water-yielding contaminants therefrom, and to saturate any olefins that may be contained therein. Catalytic processes may employ traditional sulfur reducing catalyst formulations known to the art including refractory inorganic oxide supports containing metals selected from the group comprising Group VI-B (IUPAC 6), Group II-B(IUPAC 12), and Group VIII(IUPAC 8–10) of the Periodic Table.

The following examples are presented to elucidate the catalyst and process of the present invention, demonstrating selectivity advantages over prior-art technology. These examples are offered as illustrative embodiments and should not be interpreted as limiting the claims.

EXAMPLE I

The advantages of the invention are illustrated through characterization and performance data for Catalysts A, B and C relative to Catalysts X, Y and Z, respectively, as described hereinbelow. Three particles of each catalyst were tested for metals distribution. Catalysts A, B and C comprise platinum and tin without indium, while Catalysts X, Y and Z comprise platinum, tin and indium. Catalysts A and X comprise uniformly distributed platinum, while Catalysts B, C, Y and Z comprise surface-layer platinum. In the examples presented hereinbelow, platinum concentration is measured from the surface to the center, or over the radius, of the catalyst particle.

EXAMPLE II

A spherical catalyst of the prior art comprising tin and uniformly dispersed platinum on an alumina support was prepared by conventional techniques as a control catalyst for performance tests in comparison with catalysts of the invention. Tin was incorporated into alumina sol according to the prior art by commingling a tin component with aluminum hydrosol. The tin-containing alumina sol was oil-dropped to form 1.6 mm spheres which were steamed to dryness at about 10% LOI and calcined at 650° C. with 3% steam. The resulting calcined composite was impregnated with chloroplatinic acid in HCl to provide 0.38 mass-% Pt in the finished catalyst. The impregnated catalyst was dried and oxychlorinated at 525° C. with 2M HCl in air and reduced with pure $H_2$ at 565° C.

The finished control catalyst was designated as Catalyst A and had the following approximate composition in mass-%:

| | |
|---|---|
| Tin | 0.3 |
| Platinum | 0.38 |
| Chloride | 1.1 |

EXAMPLE III

A spherical catalyst of the prior art comprising tin and uniformly dispersed platinum on an alumina support was prepared by conventional techniques as a control catalyst for performance tests in comparison with catalysts of the invention. Tin-containing alumina sol was oil-dropped to form 1.6 mm spheres steamed to dryness at about 10% LOI and calcined at 650° C. as in Example II. The spherical support then was impregnated with indium chloride in HCl and oxychlorinated at 525° C. The resulting composite was impregnated with chloroplatinic acid in HCl to provide 0.38 mass-% Pt in the finished catalyst. The impregnated catalyst was dried and oxychlorinated at 525° C. with 2M HCl in air and reduced with pure $H_2$ at 565° C.

The finished In-containing control catalyst was designated as Catalyst X and had the following approximate composition in mass-%:

| | |
|---|---|
| Indium | 0.76 |
| Tin | 0.3 |
| Platinum | 0.38 |
| Chloride | 1.3 |

EXAMPLE IV

Catalysts A and X were evaluated by Scanning Election Microscopy (SEM). The purpose of this analysis was to identify the relative distribution of platinum across the radius of particles of the catalyst, as well as to examine the distribution of tin. Three particles each of A and X were evaluated in order to provide reliable average data.

The SEM data shows the approximate metals content of any one point within the catalyst pill, as indicated hereinabove, based on the metals distribution profile in relation to the support. The data are useful for determining relative concentrations of metals across the catalyst particles, but do not necessarily represent accurate absolute values.

Figure 1:
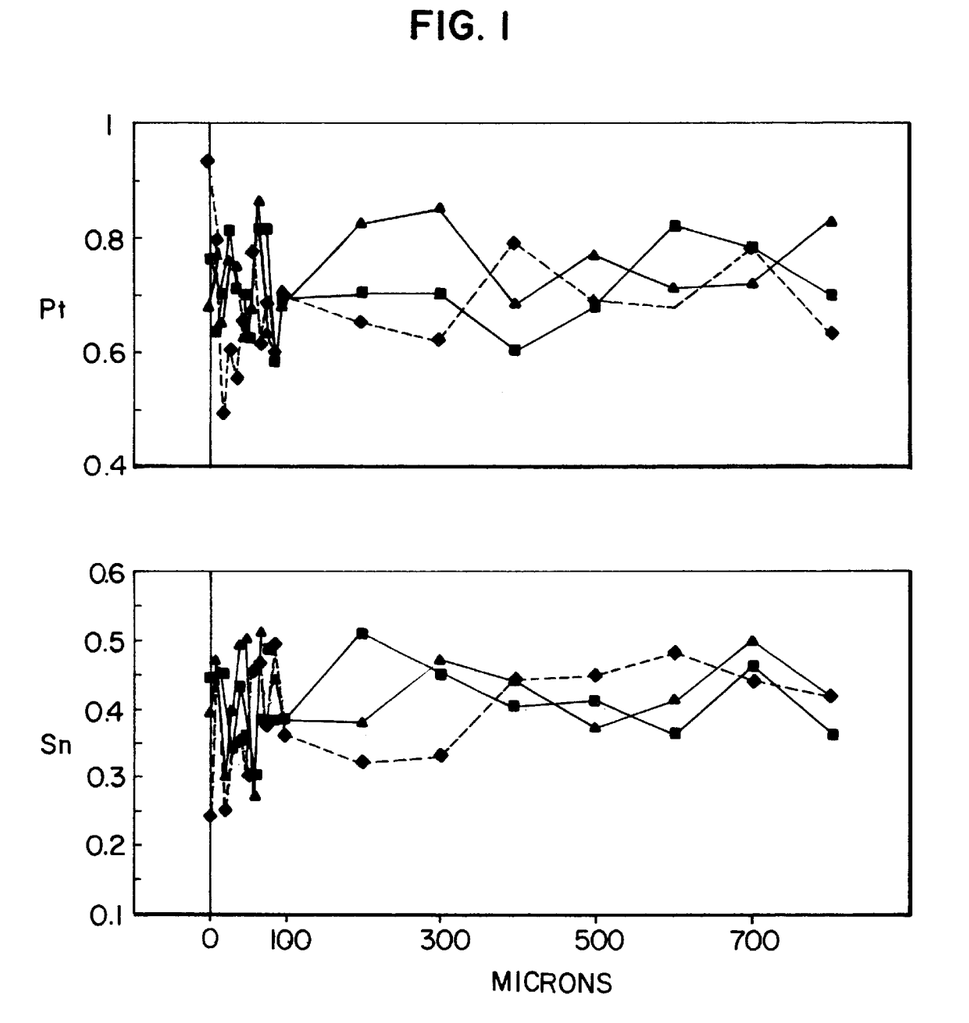
FIG. 1 shows the concentration of platinum and tin across the radius of spherical particles of Catalyst A.

FIG. 1 shows the distribution of platinum and tin across the 800-micron radius of the spherical particles of Catalyst A from the surface to the center of each particle. Catalyst A displayed a relatively even distribution of both platinum and tin across the catalyst particles, with no discernable trend in concentration and greater variation among the three catalyst particles tested than in relative concentrations in different layers of the particles. Less than about 25% of the platinum or tin is concentrated in the 50-micron surface layer of the particle, and less than about 40% is in the 100-micron surface layer.

Figure 2:
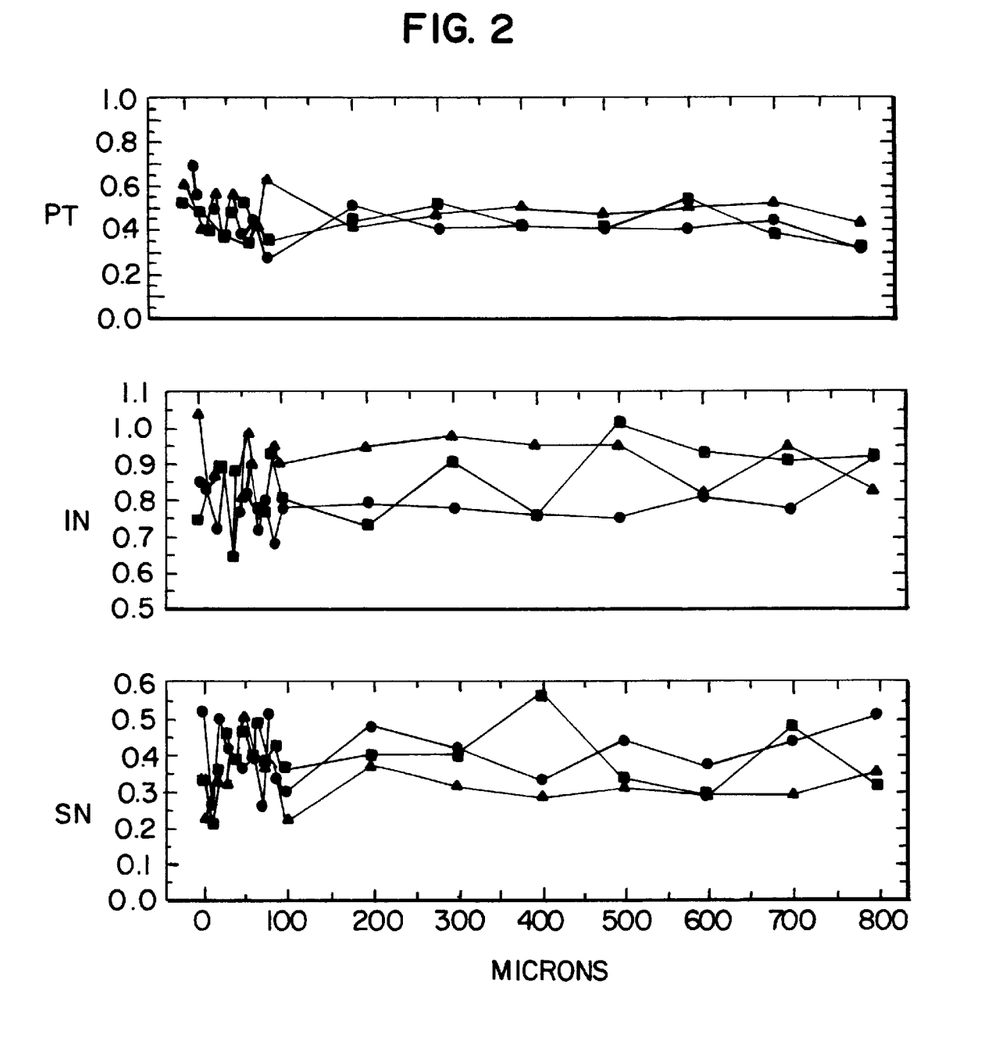
FIG. 2 shows the concentration of platinum, indium and tin across the radius of spherical particles of Catalyst X.

FIG. 2 shows the distribution of platinum and tin across the 800-micron radius of the spherical particles of Catalyst X from the surface to the center of each particle. Catalyst X displayed a relatively even distribution of platinum, indium and tin across the catalyst particles, with no discernable trend in concentration and greater variation among the three catalyst particles tested than in relative concentrations in different layers of the particles. Less than about 25% of the platinum, indium or tin is concentrated in the 50-micron surface layer of the particle, and less than about 40% is in the 100-micron surface layer.

EXAMPLE V

Pilot-plant tests were structured to compare the selectivity to $C_5+$ product in reforming a naphtha feedstock when utilizing Catalysts A and X. The tests were based on reforming naphtha over the catalysts at a pressure of 0.8 MPa (abs), liquid hourly space velocity of 3 $hr^{-1}$, and hydrogen/hydrocarbon mol ratio of 8. A range of conversion was studied by varying temperature to provide data points at 502° C., 512° C., 522° C., and 532° C. The naphtha for the comparative tests was a hydrotreated petroleum-derived naphtha derived from a paraffinic mid-continent crude oil which had the following characteristics:

| Specific gravity | 0.737 |
|---|---|
| Distillation, ASTM D-86, °C. | |
| IBP | 87 |
| 10% | 97 |
| 50% | 116 |
| 90% | 140 |
| EP | 159 |
| Mass-% paraffins | 60 |
| naphthenes | 27 |
| aromatics | 13 |

Figure 3:
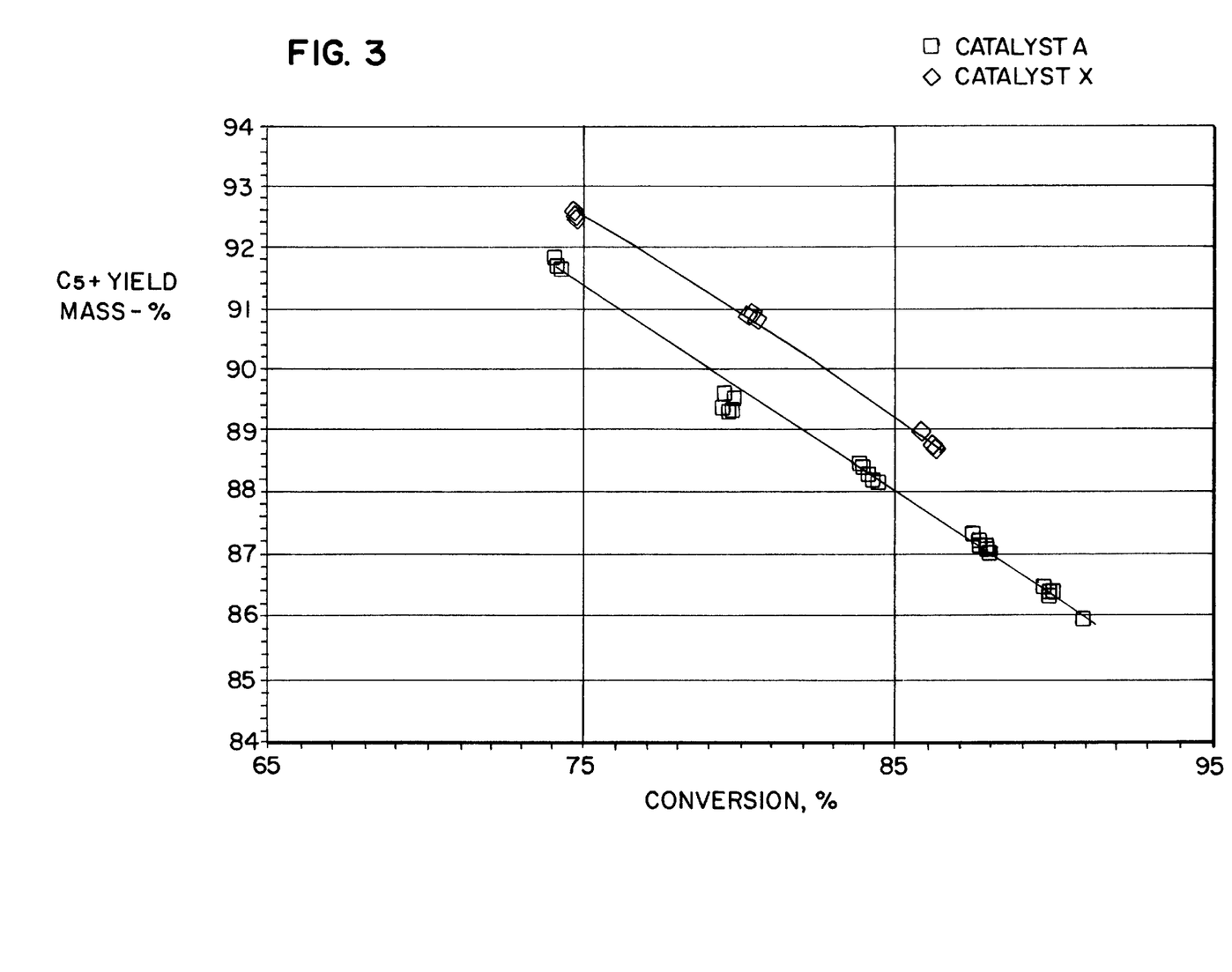
FIG. 3 shows a comparison of $C_5$+ yield vs. conversion for Catalysts A and X.
Figure 4:
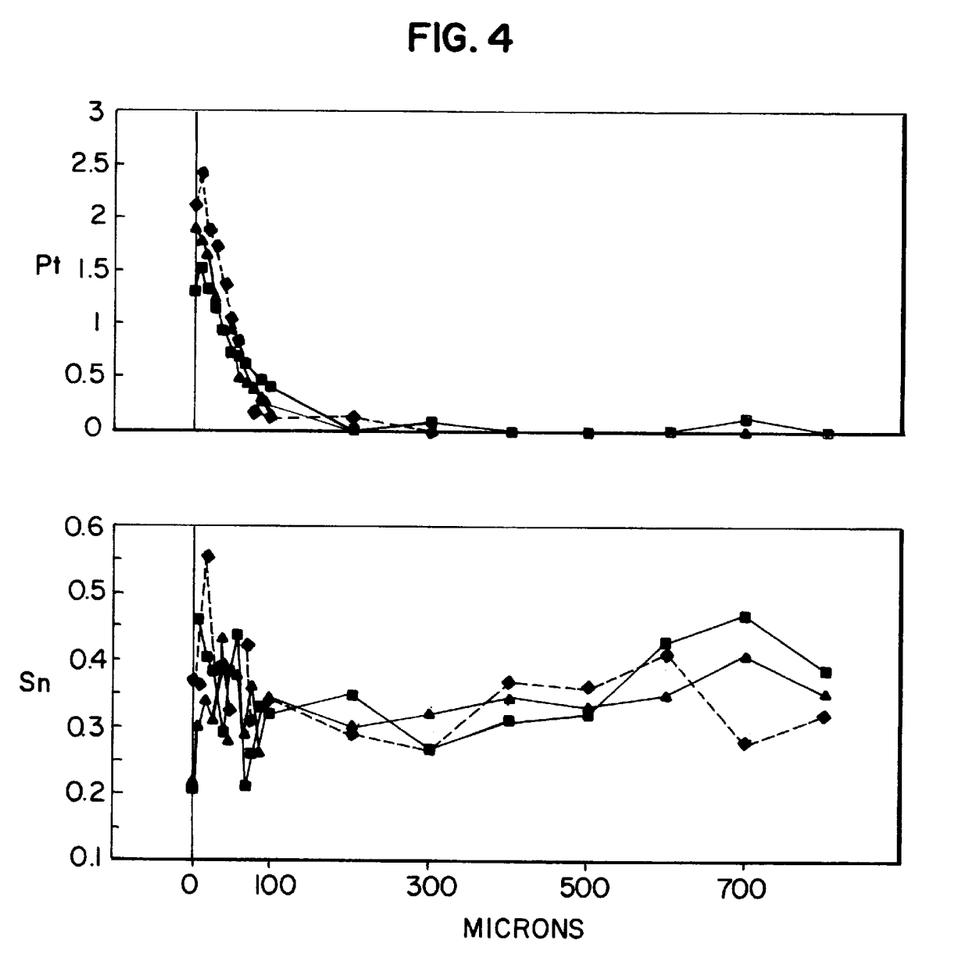
FIG. 4 shows the concentration of platinum and tin across the radius of spherical particles of Catalyst B.
Figure 5:
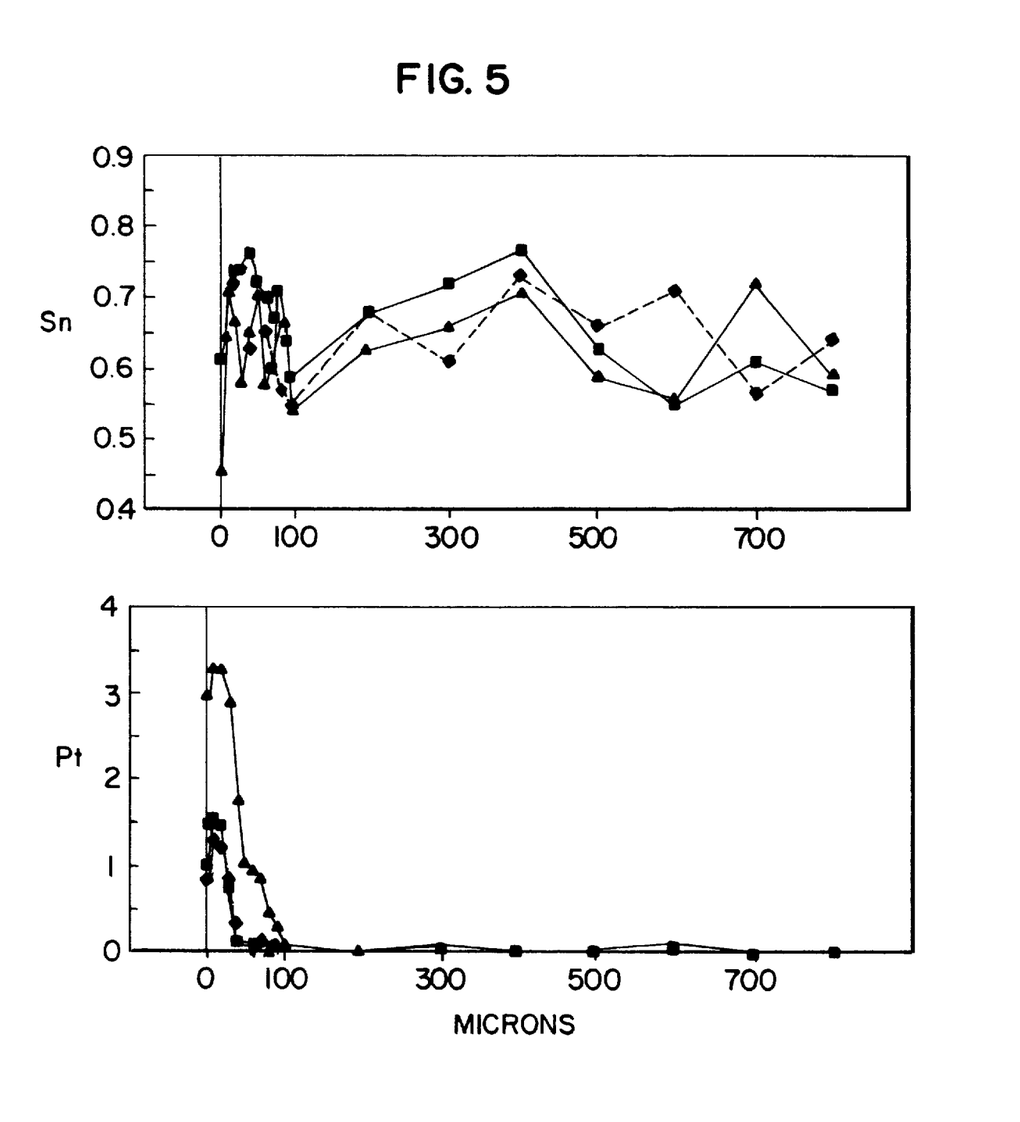
FIG. 5 shows the concentration of platinum and tin across the radius of spherical particles of Catalyst C.
Figure 6:
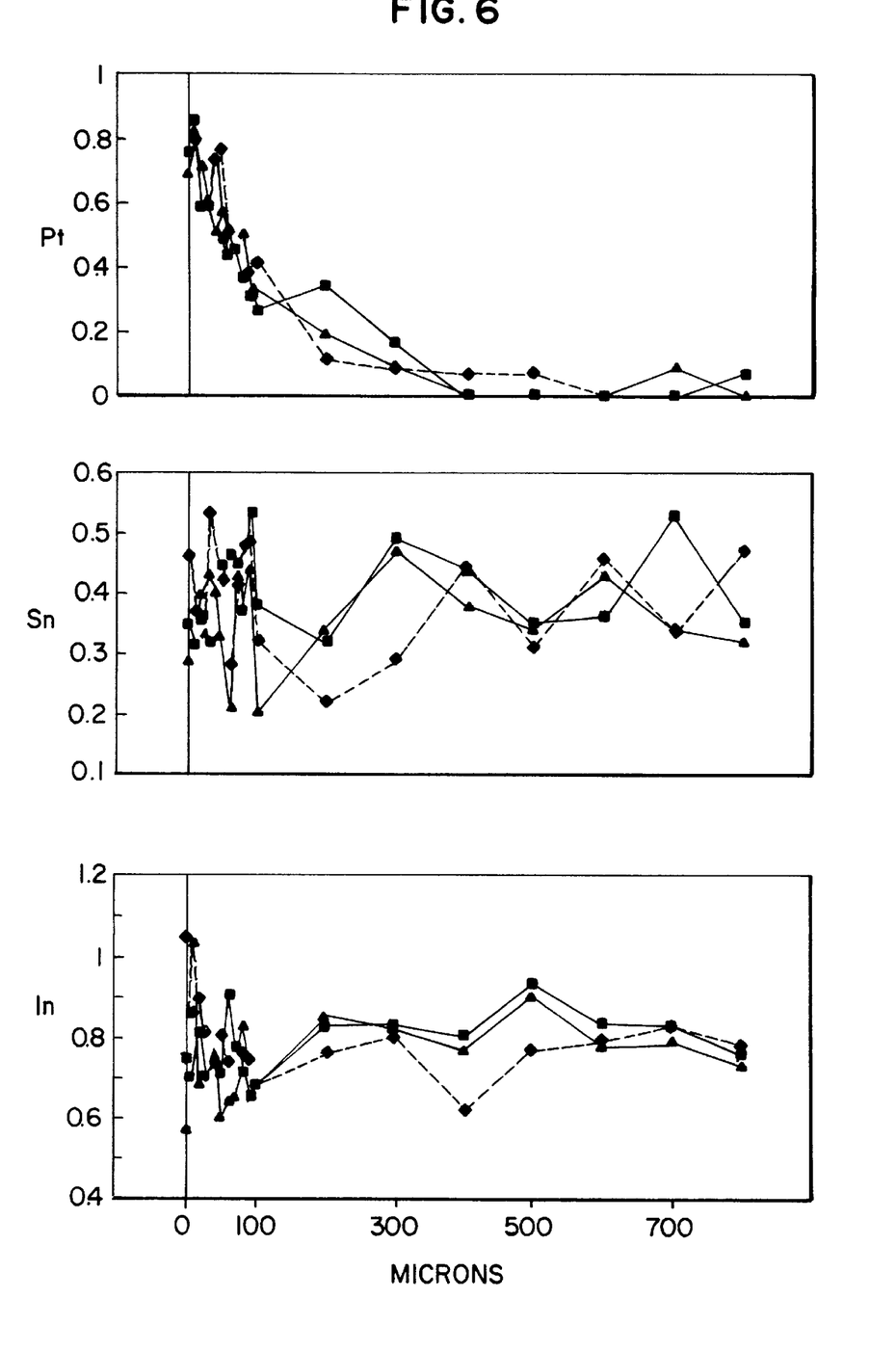
FIG. 6 shows the concentration of platinum, indium and tin across the radius of spherical particles of Catalyst Y.
Figure 7:
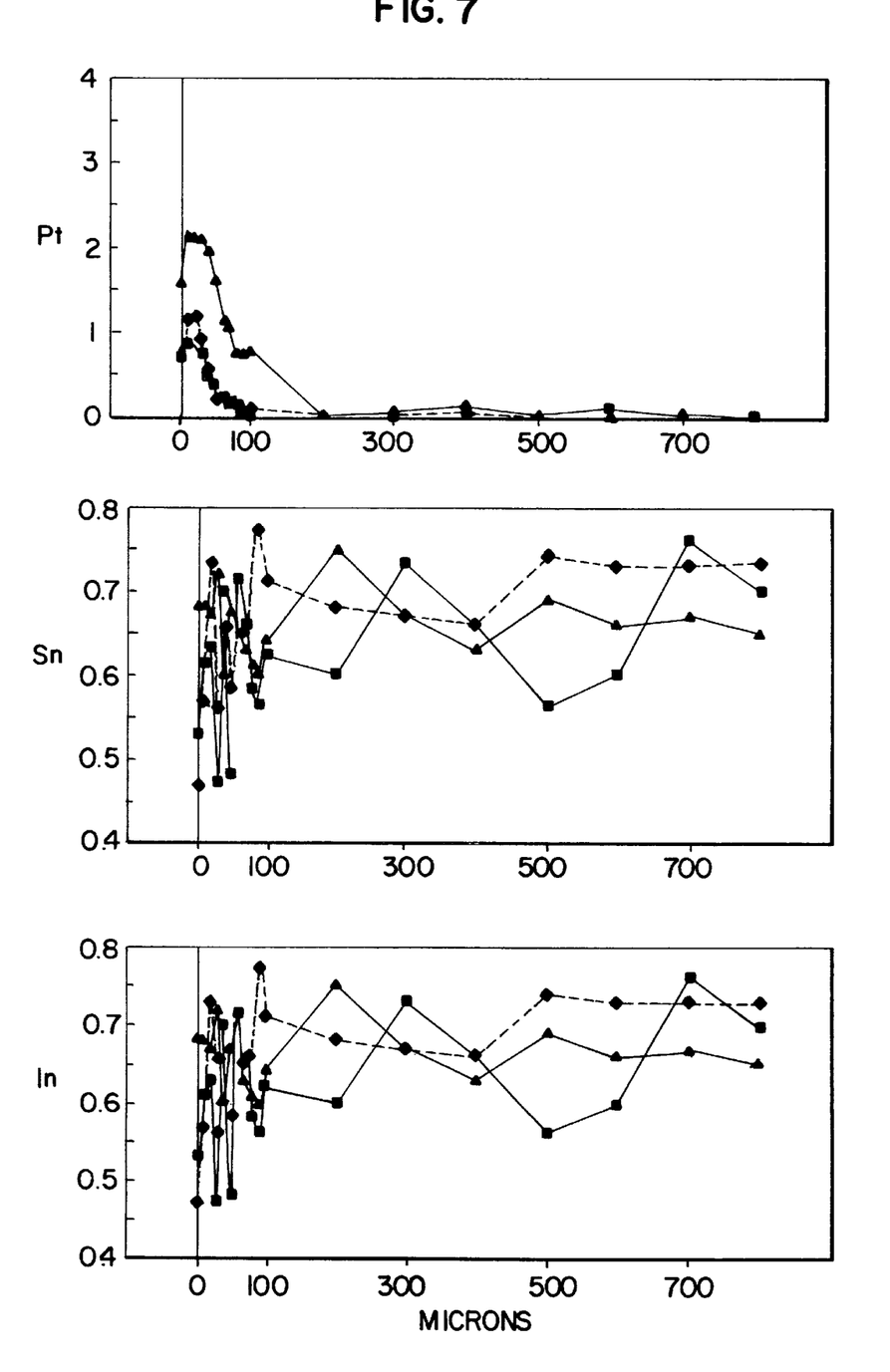
FIG. 7 shows the concentration of platinum, indium and tin across the radius of spherical particles of Catalyst Z.

The results are shown in FIG. 3 as $C_5+$ yield vs. conversion of paraffins and naphthenes for Catalysts A and X. Since a high $C_5+$ yield indicates the efficiency of production of gasoline-range components from the feedstock, $C_5+$ yield is an indication of high selectivity. Indium-containing Catalyst X shows a $C_5+$ yield advantage of about 0.9 mass-% over Catalyst A in the 75–85% conversion range.

EXAMPLE VI

Two composites were prepared in the same manner as Catalyst A through steps of incorporating tin into alumina and calcination. The composites then were processed as follows to incorporate a surface-layer platinum component into the finished catalyst.

Catalyst B was prepared by spray impregnation of a platinum component onto the tin-containing alumina spheres. The spheres were tumbled in a drum while a solution of chloroplatinic acid was pumped though a spray nozzle for about 15–20 minutes. The solution volume amounted to about 25% of the pore volume of the catalyst and comprised sufficient platinum component to provide 0.27 mass-% Pt in the finished catalyst. After rolling was completed, the spray-impregnated catalyst was dried for 2 hours at about 180° C., oxychlorinated at 525° C. with 2M HCl in air and reduced with pure $H_2$ at 565° C.

Catalyst C was prepared using a multi-dentated ligand, thiomalic acid (TMA), to effect surface-layer platinum in an amount of about 0,25 mass-% on the finished catalyst. The tin-containing alumina spheres were contacted with a solution of thiomalic acid and chloroplatinic acid in a rotary evaporator, cold-rolled for 30 minutes, and the solution was evaporated with steam. The resulting catalyst was dried, steamed for 3 hr at 525° C., oxychlorinated at 525° C. with 2M HCl in air and reduced with pure $H_2$ at 565° C.

The catalysts had the following respective compositions in mass-%:

| | Catalyst: | |
|---|---|---|
| | B | C |
| Tin | 0.32 | 0.60 |
| Platinum | 0.27 | 0.25 |
| Chloride | 1.2 | 1.3 |

EXAMPLE VII

Catalyst Y of the invention was prepared in the same manner as the control Catalyst X through steps of incorporating tin into alumina and impregnation of an indium component, and then was calcined at 650° C. with 3% steam. The composite then was processed as follows to incorporate surface-layer platinum by spray impregnation of a platinum component onto the tin- and indium-containing alumina spheres. The spheres were tumbled in a drum while being sprayed with a solution of chloroplatinic acid in HCl to provide 0.25 mass-% Pt in the finished catalyst. The spray-impregnated catalyst was dried, oxychlorinated at 525° C. with 2M HCl in air and reduced with pure $H_2$ at 565° C.

Catalyst Z was prepared using a multi-dentated ligand, thiomalic acid (TMA), to effect surface-layer platinum. Tin and indium were incorporated into alumina spheres by commingling tin chloride and indium chloride with aluminum hydrosol and oil-dropping the sol to form spheres which were steamed to dryness at about 10% LOI and calcined at 650° C. The tin- and indium-containing alumina spheres were contacted with a solution of thiomalic acid and chloroplatinic acid in a rotary evaporator, cold-rolled for 30 minutes, and the solution was evaporated with steam. The resulting catalyst was dried, steamed for 3 hr at 525° C., oxychlorinated at 525° C. with 2M HCl in air and reduced with pure $H_2$ at 565° C.

The catalysts had the following respective compositions in mass-%:

| | Catalyst: | |
|---|---|---|
| | Y | Z |
| Indium | 0.78 | 0.77 |
| Tin | 0.3 | 0.61 |
| Platinum | 0.25 | 0.25 |
| Chloride | 1.1 | 1.3 |

EXAMPLE VIII

Catalysts B, C, Y and Z were evaluated by Scanning Election Microscopy (SEM). The purpose of this analysis was to identify the relative distribution of platinum across the radius of particles of the catalyst, as well as to examine the distribution of tin and, for catalysts Y and Z, indium. Three particles each of B, C, Y and Z were evaluated in order to provide reliable average data.

The SEM data shows the approximate metals content of any one point within the catalyst pill, as indicated hereinabove, based on the metals distribution profile in relation to the support. The data are useful for determining relative concentrations of metals across the catalyst particles, but do not necessarily represent accurate absolute values.

FIG. 4, 5, 6 and 7 shows distribution of platinum, indium and tin across the radius of the catalyst particles respectively for Catalysts B, C, Y and Z. All of the catalysts show an exceptionally high concentration of platinum on a relative basis in the surface layer of the catalyst particles, and thus are suitable for considering the effect of adding indium to reforming catalysts containing surface-layer platinum. The catalysts displayed a relatively even distribution of tin and indium when present across the catalyst particles, consistent with the distribution in Catalysts A and X, with no discernable trend in concentration.

To quantify the differences between the catalysts of the invention and of the prior art, the relative proportions of platinum in surface layers were calculated from the data presented in FIG. 1. The 100-micron surface layer represents about one-third of the volume of the spherical particle, while the 50-micron surface layer represents about 17½% of the volume of the particle. The proportion of the platinum in the average particle (of 3 determinations) which is contained in the 100-micron and 50-micron surface layer was calculated, and the concentration in the surface layers was related to the concentration in the central core. These criteria relating to platinum in the surface layer indicates that platinum is concentrated near the surface of the particles while indium and tin are uniformly dispersed:

|  | Catalyst: | | | |
| --- | --- | --- | --- | --- |
|  | B | C | Y | Z |
| % of Pt in 100μ surface layer | 94 | 55 | 99 | 83 |
| % of Pt in 50μ surface layer | 79 | 42 | 94 | 60 |
| % Pt in 100μ layer/% in core | 10.5 | 870 | 460 | 250 |
| % Pt in 100μ layer/% in core | 16.5 | 1250 | 820 | 330 |
| Std. deviation of In conc.* | — | — | 10 | 8 |
| Std. deviation of Sn conc.* | 23 | 10 | 18 | 13 |

*Standard deviation of concentration as % of average value in particle

EXAMPLE IX

Pilot-plant tests were structured to compare the selectivity to $C_5+$ product in reforming a naphtha feedstock when utilizing Catalysts B vs. Y and C vs. Z. The tests were based on reforming naphtha over the catalysts at a pressure of 0.8 MPa (abs), liquid hourly space velocity of 3 $hr^{-1}$, and hydrogen/hydrocarbon mol ratio of 8. A range of conversion was studied by varying temperature to provide data points at 502° C., 512° C., 522° C., and 532° C. The naphtha for the comparative tests was the same naphtha use in the tests described in Example V:

| Specific gravity | 0.737 |
| --- | --- |
| Distillation, ASTM D-86, °C. | |
| IBP | 87 |
| 10% | 97 |
| 50% | 116 |
| 90% | 140 |
| EP | 159 |

-continued

| Mass-% paraffins | 60 |
| --- | --- |
| naphthenes | 27 |
| aromatics | 13 |

Figure 8:
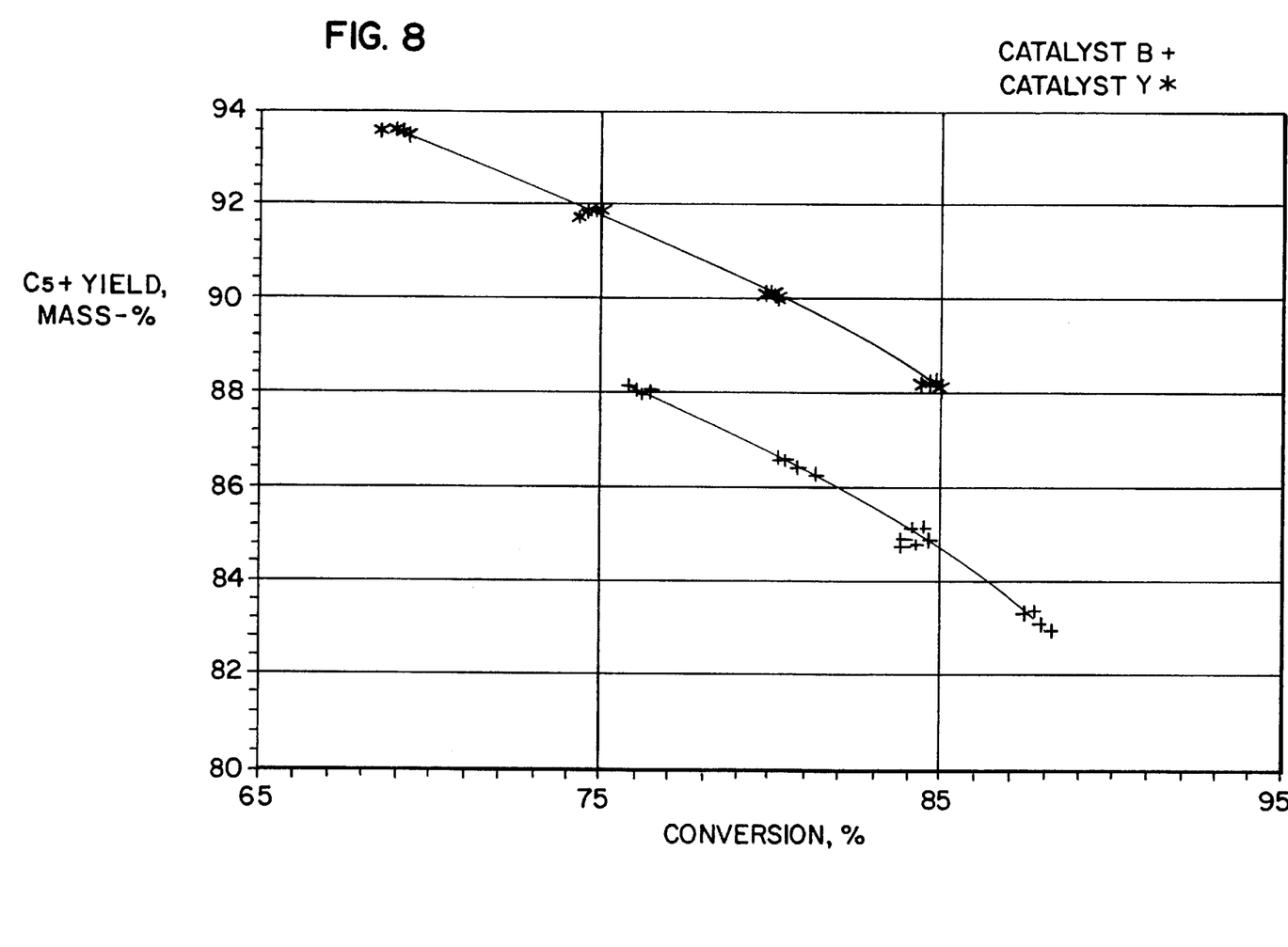
FIG. 8 shows a comparison of $C_5$+ yield vs. conversion for Catalysts B and Y.
Figure 9:
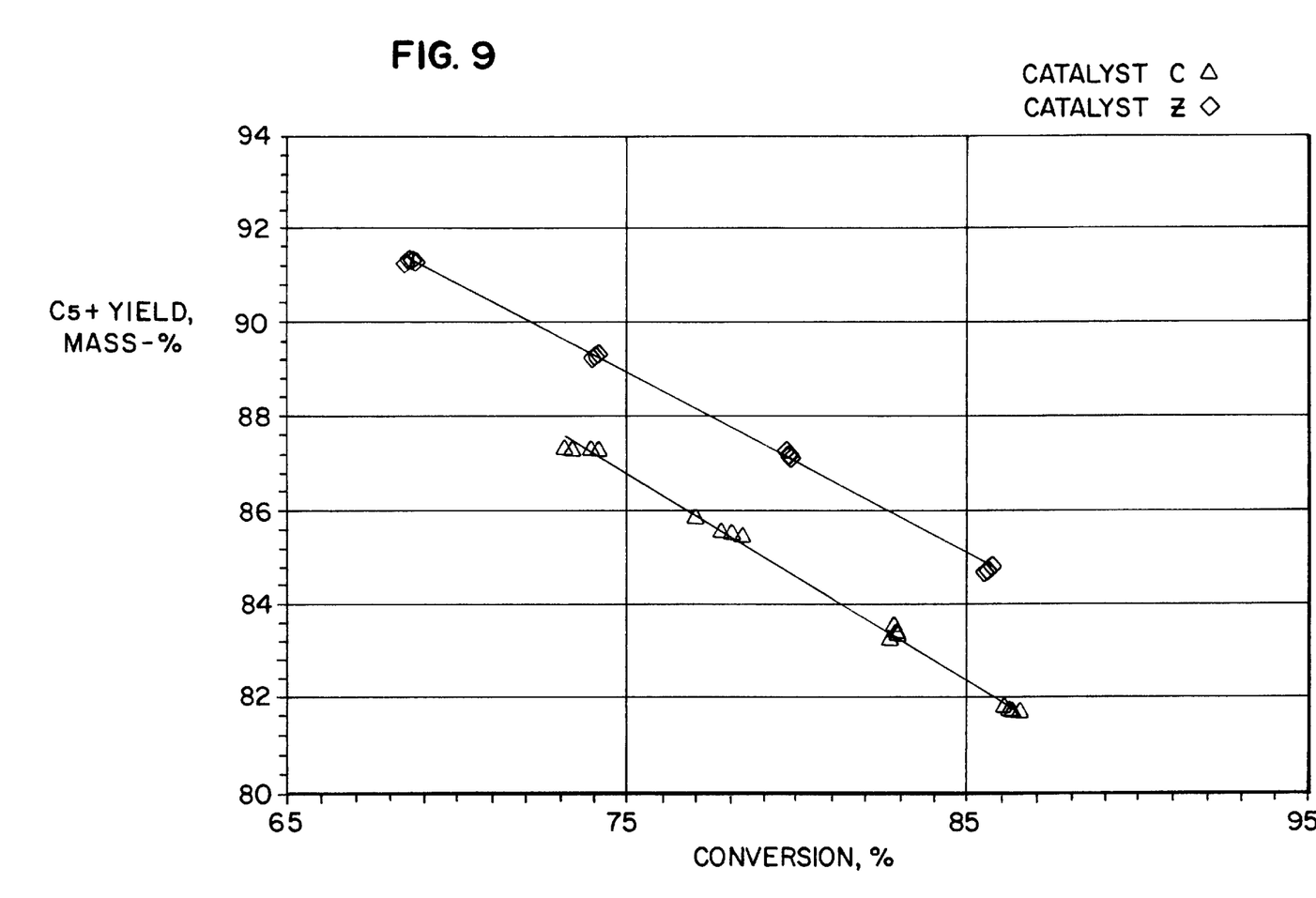
FIG. 9 shows a comparison of $C_5$+ yield vs. conversion for Catalysts C and Z.

The results are shown in FIG. 8 as $C_5+$ yield vs. conversion of paraffins and naphthenes for Catalysts B and Y and in FIG. 9 as $C_5+$ yield vs. conversion for Catalysts C and Z. Since a high $C_5+$ yield indicates the efficiency of production of gasoline-range components from the feedstock, $C_5+$ yield is an indication of high selectivity. The respective indium-containing catalysts demonstrate improvements in such selectivity over catalysts not containing indium. Recalling also the results in Example V, the relative $C_5+$ yield advantages in the 75–85% conversion range are as follows in mass-%:

| Catalysts | $\Delta C_5+$ |
| --- | --- |
| X vs. A (uniform Pt) | 0.9 |
| Y vs. B (spray impregnation) | 2.7 |
| Z vs. C (TMA impregnation) | 2.2 |

Indium modification is clearly more advantageous with respect to the reforming catalysts containing surface-layer platinum.

We claim:

1. A dual-function naphtha reforming catalyst comprising a combination of a refractory inorganic oxide support with a multigradient metal component comprising about 0.1 to 5 mass-% on an elemental basis of a uniformly dispersed indium component, about 0.01 to 5 mass-% on an elemental basis of a uniformly dispersed Group IVA (IUPAC 14) metal component, from about 0.1 to 10 mass-% on an elemental basis of a halogen component and about 0.01 to 2 mass-% on an elemental basis of a platinum-group metal component wherein particles of the catalyst are characterized as containing about 40% or more of the platinum-group metal in a 50-micron surface layer of the particles and the concentration of the platinum-group metal in the 50-micron surface layer of the particles is at least five times the concentration of the platinum-group metal in a central core having a diameter that is 50% of the diameter of the particles and wherein the atomic ratio of indium to platinum-group metal is at least about 3:1.

2. The catalyst of claim 1 wherein the refractory inorganic oxide comprises alumina.

3. The catalyst of claim 1 wherein the Group IVA(IUPAC 14) metal component comprises a tin component.

4. The catalyst of claim 1 wherein the platinum-group metal component comprises a platinum component.

5. The catalyst of claim 1 wherein the halogen comprises chlorine.

6. A dual-function naphtha-reforming catalyst comprising a combination of a refractory inorganic oxide support with a multigradient metal component comprising about 0.1 to 5 mass-% on an elemental basis of a uniformly dispersed indium component, about 0.01 to 5 mass-% on an elemental basis of a uniformly dispersed tin component, from about 0.1 to 10 mass-% on an elemental basis of a chlorine component and about 0.01 to 2 mass-% on an elemental basis of a platinum component wherein particles of the catalyst are characterized as containing about 40% or more of the platinum-group metal in a 50-micron surface layer of the particles and the concentration of the platinum-group metal in the 50-micron surface layer of the particles is at least five times the concentration of the platinum-group metal in a central core having a diameter that is 50% of the diameter of the particles and wherein the atomic ratio of indium to platinum-group metal is at least about 3:1.

7. A method of preparing a dual-function naphtha-reforming catalyst comprising a combination of a refractory inorganic oxide support with a multigradient metal component comprising about 0.1 to 5 mass-% on an elemental basis of indium, about 0.01 to 5 mass-% on an elemental basis of a Group IVA (IUPAC 14) metal, about 0.1 to 10 mass-% on an elemental basis of a halogen and about 0.01 to 2 mass-% on an elemental basis of a platinum-group metal, comprising the steps of:

(a) forming particles of a support comprising a refractory inorganic oxide;

(b) combining compounds of the Group IVA (IUPAC 14) metal and of indium into the support to effect a uniform composite comprising a uniformly dispersed indium component and a uniformly dispersed Group IVA (IUPAC 14) metal component;

(c) incorporating a compound of the platinum-group metal into the uniform composite to effect a catalytic composite comprising a surface-layer platinum-group metal component wherein particles of the catalyst are characterized as containing about 40% or more of the platinum-group metal in a 50-micron surface layer of the particles and the concentration of the platinum-group metal in 50-micron surface layer of the particles is at least five times the concentration of the platinum-group metal in a central core having a diameter that is 50% of the diameter of the particles and wherein the atomic ratio of indium to platinum-group metal is at least about 3:1;

(d) oxidizing the catalytic composite at oxidation conditions to convert metallic components within the catalytic composite to their corresponding oxide form and obtain an oxidized composite; and, (e) reducing the oxidized composite at reduction conditions to reduce substantially all of the platinum-group metal component to the corresponding elemental metallic state and obtain the catalyst.

8. The method of claim 7 comprising spray-impregnating the platinum-group metal component onto the uniform composite to effect a catalytic composite comprising a surface-layer platinum-group metal component.

9. The method of claim 7 comprising complexing the platinum group metal and the refractory inorganic oxide support using a multi-dentated ligand to effect a catalytic composite comprising a surface-layer platinum-group metal component.

* * * * *